BEST AVAILABLE COPY

June 18, 1935. C. WEXELBERG Re. 19,618

REFRIGERATOR CABINET

Original Filed Dec. 5, 1932

INVENTOR
Clarence Wexelberg
BY
Dike, Calver & Gray
ATTORNEYS.

Reissued June 18, 1935

BEST AVAILABLE COPY

Re. 19,618

UNITED STATES PATENT OFFICE 19,618

DESIGN FOR A REFRIGERATOR CABINET

Clarence Wexelberg, Detroit, Mich., assignor, by mesne assignments, to General Household Utilities Company, Chicago, Ill., a corporation of Delaware Original No. 93,314, dated September 11, 1934, Serial No. 46,312, December 5, 1932, for 14 years. Application for reissue February 15, 1935, Serial No. 55,455. Term of patent 14 years

*To all whom it may concern:*

Be it known that I, Clarence Wexelberg, a citizen of the United States, residing in Detroit, in the county of Wayne and State of Michigan, have invented a new, original, and ornamental Design for Refrigerator Cabinets, of which the following is a specification, reference being had therein to the accompanying drawing, forming a part thereof, in which.

Figure 1:
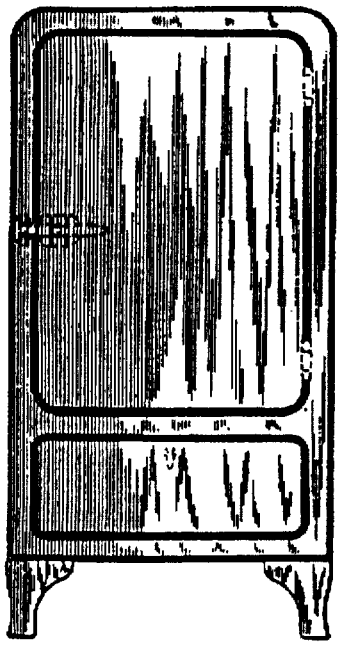
Fig. 1 is a front elevational view of the refrigerator cabinet showing my new design.
Figure 2:
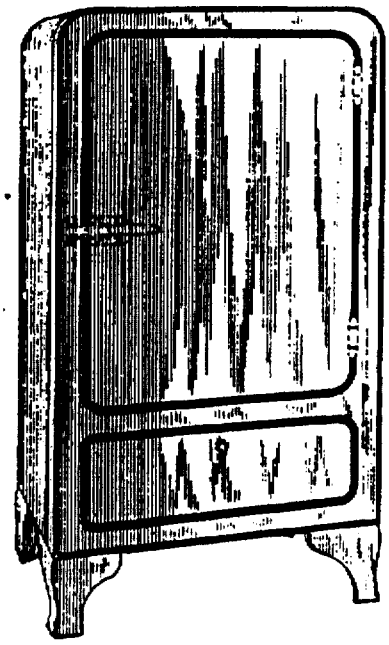
Fig. 2 is a front perspective view thereof.

I claim:

The ornamental design for a refrigerator cabinet substantially as shown.

CLARENCE WEXELBERG.